United States Patent
Chandar et al.

(10) Patent No.: US 10,116,434 B2
(45) Date of Patent: Oct. 30, 2018

(54) METHOD FOR TRANSIENT CHANGE DETECTION WITH ADAPTIVE SAMPLING, AND DETECTOR IMPLEMENTING THE METHOD

(71) Applicants: INSTITUT MINES-TELECOM, Paris (FR); MASSACHUSETTS INSTITUTE OF TECHNOLOGY, Cambridge, MA (US)

(72) Inventors: Venkat Chandar, New York, NY (US); Aslan Tchamkerten, Verrieres le Buisson (FR)

(73) Assignees: INSTITUT MINES-TELECOM, Paris (FR); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 0 days.

(21) Appl. No.: 15/539,001

(22) PCT Filed: Dec. 24, 2014

(86) PCT No.: PCT/IB2014/003138
§ 371 (c)(1),
(2) Date: Jun. 22, 2017

(87) PCT Pub. No.: WO2016/102999
PCT Pub. Date: Jun. 30, 2016

(65) Prior Publication Data
US 2017/0353293 A1    Dec. 7, 2017

(51) Int. Cl.
H04L 27/06    (2006.01)
H04L 7/04    (2006.01)
(Continued)

(52) U.S. Cl.
CPC ............. *H04L 7/042* (2013.01); *G06F 17/15* (2013.01); *H04B 1/70752* (2013.01); *H04L 43/024* (2013.01)

(58) Field of Classification Search
CPC ......... G06F 17/15; G06F 19/34; H04L 43/00; H04L 7/04; H04L 12/26; H04L 2463/121;
(Continued)

(56) References Cited

U.S. PATENT DOCUMENTS 5,870,022 A    2/1999  Kuhnly
7,656,970 B1   2/2010  Sankabathula
(Continued)

OTHER PUBLICATIONS

Tchamkerten et al. Energy and sampling constrained asynchronous communication; Mar. 2013;IEEE international symposium on information theory; pp. 1-12.*
(Continued)

*Primary Examiner* — Rahel Guarino
(74) *Attorney, Agent, or Firm* — Pearne & Gordon LLP

(57) ABSTRACT

A method of detecting transient changes in the distribution of a discrete time series includes: operating in a sparse mode wherein, at sniff periods successively repeated at a first rate, at most K test phases are performed, K being an integer superior or equal to two, each test phase consisting of analyzing, by a sampling stopping time determination unit, samples of the time series captured by a sampler at sampling times according to a second rate which is higher than the first rate to provide a positive or negative result of the test phase. If the results of K successive test phases of a sniff period are each positive, the method switches to operate in a dense mode wherein the sampler is operated to continuously capture samples of the time series at sampling times according to the second sampling rate.

15 Claims, 2 Drawing Sheets

(51) Int. Cl.
  *H04L 12/26* (2006.01)
  *H04B 1/7075* (2011.01)
  *G06F 17/15* (2006.01)

(58) Field of Classification Search
  CPC ............. H04L 63/1408; H04L 63/1416; H04L 43/0817; H04L 43/16; H04B 17/373; H04B 1/7075
  See application file for complete search history.

(56) References Cited

U.S. PATENT DOCUMENTS

2005/0197590 A1   9/2005   Osorio
2009/0296860 A1   12/2009  Chester

OTHER PUBLICATIONS

Chandar, V., et al., "Quickest Transient-Change Detection under a Sampling Constraint", Jan. 23, 2015, XP055210156, Retrieved from the Internet, URL: http://arxiv.org/abs/1501.05930, Retrieved on Aug. 31, 2015.

Banerjee, T., et al. "Data-efficient Quickest Change Detection in Minimax Settings" IEEE Transactions on Information Theory, vol. 59, No. 10, Oct. 2013.

Broder, B., et al., "Quickest Detection Procedures and Transient Signal Detection" DTIC Document, Tech Report, Nov. 1990.

Han, C., et al., "Some Methods to Evaluate the Performance of Page's Test as Used to Detect Transient Signals", Signal Processing, IEEE Transactions on Signal Processing, vol. 47, No. 8, Aug. 1999.

Lai, T., "Information Bounds and Quick Detection of Parameter Changes in Stochastic Systems", IEEE Transactions on Information Theory, vol. 44, No. 7, Nov. 1998.

Tchamkerten, Asian, et al., "Energy and Sampling Constrained Asynchronous Communication", Mar. 22, 2013, XP055210178, Retrieved from the Internet: URL:http://arxiv.org/pdf/1302.6574v2.pdf, Retrieved on Aug. 28, 2015.

International Search Report issued in Patent Application No. PCT/IB2014/003138 dated Sep. 7, 2015.

Written Opinion issued in Patent Application No. PCT/IB2014/003138 dated Sep. 7, 2015.

* cited by examiner

METHOD FOR TRANSIENT CHANGE DETECTION WITH ADAPTIVE SAMPLING, AND DETECTOR IMPLEMENTING THE METHOD

TECHNICAL FIELD

The field of the invention is that of transient changes detection in the distribution of a discrete time series. Such detection may find application in manufacturing (quality control), intrusion detection, spam filtering, website tracking, and medical diagnostics.

More particularly, the invention deals with detecting transient changes in a time series while operating with a limited sampling rate. An illustrative example of the invention deals with data detection in an asynchronous communication.

STATE OF THE ART

Change point detection tries to identify times when the probability distribution of a time series changes. Change-point detection problems indeed consider a discrete time series which undergoes a local change in distribution from nominal distribution P0 to change distribution P1 at an unknown time. Before the change, the time series shows its nominal distribution P0. From the time the change occurs, the time series is distributed according to the change distribution P1. Then, after the change of limited duration, the time series returns to its nominal distribution P0.

Such detection problems have been investigated in a variety of studies. In [1], [2, Chap. 3], for instance, the CUSUM detection procedure, originally proposed to detect non-transient changes, is investigated for detecting transient changes of given length. In [3, Section II.c], a variation of the CUSUM procedure is shown to achieve minimal detection delay in a certain asymptotic regime where the duration of the change is tied to a (vanishing) false-alarm probability constraint. Finally, [4] proposed another CUSUM procedure that operates under a sampling constraint and that is tailored for detecting non-transient changes. This procedure has the salient feature of skipping samples in the event that a change is unlikely to have occurred.

[1] B. Broder and S. Schwartz, "Quickest detection procedures and transient signal detection," DTIC Document, Tech. Rep., 1990.

[2] C. Han, P. K. Willett, and D. A. Abraham, "Some methods to evaluate the performance of page's test as used to detect transient signals," Signal Processing, IEEE Transactions on, vol. 47, no. 8, pp. 2112-2127, 1999.

[3] T. L. Lai, "Information bounds and quick detection of parameter changes in stochastic systems," Information Theory, IEEE Transactions on, vol. 44, no. 7, pp. 2917-2929, 1998.

[4] T. Banerjee and V. Veeravalli, "Data-efficient quickest change detection in minimax settings," Information Theory, IEEE Transactions on, vol. 59, no. 10, pp. 6917-6931, October 2013.

DESCRIPTION OF THE INVENTION

The invention is focused on detecting a transient change in the distribution of a sequential time series with a minimized detection delay subject to false alarm and sampling constraints. By a sampling constraint, it is meant that an on-off observation control policy is implemented, so as to sample the sequential time series only a fraction of time.

More particularly, the invention is directed at providing a method for rapidly detecting a transient change in a sequential time series via an adaptive sampling strategy minimizing the sampling rate while allowing to detect the change as efficiently as under full sampling.

To this purpose, the invention provides a transient change detection method, wherein a sampler switches from operating in a sparse mode wherein it captures samples during sniff periods successively repeated at a first rate to operating in a dense mode wherein it captures samples at a second rate which is higher than the first rate, the switching from the sparse mode to the dense mode being performed only if a series of tests performed on the samples captured during a sniff period are positive and a sniff period being terminated as soon as a test of the series of tests is negative.

A next test in the series of tests of a sniff period is performed only if the result of the previous test in the series of tests of the sniff period is positive, the next test phase being performed with analyzing at least as many samples as the previous test.

In an embodiment, the method of detecting transient changes in the distribution of a discrete time series, comprises the steps of:
- operating in the sparse mode wherein, at sniff periods successively repeated at a first rate, at most K test phases are performed, K being an integer superior or equal to two, each test phase consisting of analyzing, by a sampling stopping time determination unit, samples of the time series captured by a sampler at sampling times according to a second rate which is higher than the first rate to provide a positive or negative result of the test phase;
- if the results of K successive test phases of a sniff period are each positive, switching to operate in the dense mode wherein the sampler is operated to continuously capture samples of the time series at sampling times according to the second sampling rate; wherein a sniff period is ended as soon as the analyzing of the at least one captured sample in a test phase of the sniff period is negative, the sampling of the time series being stopped until the next sniff period; and wherein a next test phase of a sniff period is performed only if the result of the previous test phase of the sniff period is positive, the next test phase being performed with analyzing at least as many samples as the previous test phase.

Preferred but non limitative features of this method are as follows:
- a next test phase of a sniff period analyses exponentially more samples that the previous test phase of the sniff period;
- said analyzing the captured samples in a test phase by the sampling stopping time determination unit comprises determining a probability that said captured samples are typical of an expected transient change in the distribution of a discrete time series;
- the transient changes correspond to information messages being received at times which are unknown to a receiver which includes said sampler and said sampling stopping time determination unit;
- the absence of the expected transient change corresponds to presence of noise only on an asynchronous data communication channel by which the receiver receives the information messages;
- it further comprises in the dense mode operating a decoder to sequentially decode the samples captured at sampling times according to the second rate.

The invention further extends to a transient change detector to detect transient changes in the distribution of a discrete time series, comprising a sampler to capture samples of a time series and a sampling stopping time determination unit to control operation of the sampler and analyze the captured samples, wherein the sampling stopping time determination unit is configured to switch operation of the sampler from capturing samples during sniff periods successively repeated at a first rate to capturing samples at a second rate which is higher than the first rate, the sampling stopping time determination unit being further configured to perform switching of the sampler operation only if a series of tests performed by the sampling stopping time determination unit on the samples captured during a sniff period are each positive, and to terminate a sniff period as soon as a test of the series of tests is negative.

BRIEF DESCRIPTION OF THE DRAWINGS

Further characteristics and advantages of the invention will appear upon reading a preferential embodiment of the invention made in reference to the appended figures in which.

DETAILED DESCRIPTION OF PARTICULAR EMBODIMENTS

The invention proposes a sequential time series change-point detection method capable of detecting transient changes in a distribution. This procedure has, at a high level, the following properties asymptotically:

1. it detects changes of minimal duration,
2. it detects changes with minimal delay,
3. it minimizes the sampling rate.

Property 1 means that no procedure can detect changes of smaller duration, irrespectively of their delay and sampling rate. Properties 2 and 3 mean that among all procedures that detect changes of minimal duration, the proposed procedure simultaneously minimizes delay and sampling rate.

The invention relates to a method of identifying transient changes in the activity of a time series. By transient change, it is meant a temporally bounded change that occurs randomly in a temporal series. Here the change, of fixed known duration n, from nominal distribution P0 to change distribution P1, occurs at a random time v uniformly distributed within a time frame of size $A_n = 2^{\alpha n}$. $A_n$ denotes the uncertainty level regarding the location of the transient change, and $\alpha$ denotes an uncertainty exponent.

Figure 3:
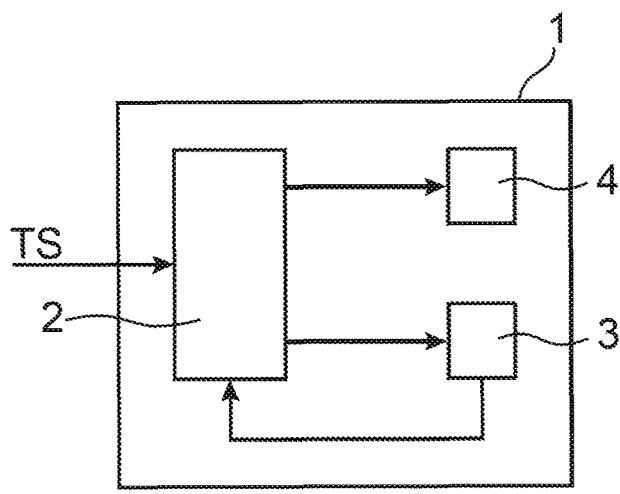
FIG. 3 is a schematic diagram of a transient change detector according to a possible embodiment of the invention.

With reference to FIG. 3, the method is implemented by a transient change detector 1 which comprises a sampler 2 to capture samples of the time series TS and a sampling stopping time determination unit 3 to analyze the captured samples and control operation of the sampler.

The sampler 2 is sampling constrained by the sampling stopping time determination unit 3 and can observe only a fraction of the sequential time series. This sampling constraint is captured by a sampling rate $\rho$.

With $\rho = 1$, the sampler 2 is always is always in the listening mode and samples every points of the time series. In order for instance to minimize energy consumption of the sampler, and/or to minimize the amount of collected samples which may have to be stored and processed, it may be favorable to reduce the sampling rate so that the sampler samples only a fraction of the time series. With $0 < \rho < 1$, $\rho$ corresponds to the ratio between the reduced sampling rate and the original sampling rate for observation of all points of the time series.

It has been demonstrated by the inventors that change detection can be performed as efficiently as under full sampling with a reduced sampling rate and thus only a limited number of samples. More specifically, for a fixed uncertainty exponent $\alpha \in (0, D(P1\|P0))$, the sampling rate $\rho$ can be made as small as $\omega(1/n)$ (in other words it dominates $1/n$ asymptotically) without any deterioration in asymptotic performance compared to full sampling in terms of false alarm probability and detection delay. In the previous sentence, $D(P1\|P0)$ denotes the Kullback-Liebler divergence between the probability distributions P1 and P0. Conversely, if $\alpha > D(P1\|P0)$ or if the sampling rate is $o(1/n)$ (it is dominated by $1/n$ asymptotically), it is impossible to reliably detect the change. Accordingly, maximal performance can be reached, while sleeping (almost) all the time.

In order to capitalize upon these results, the present invention proposes to implement an adaptive sampling strategy. In its most general form, the adaptive sampling strategy consists of a family of algorithms A_i, where the algorithm A_i makes a decision, that may be based on any subset of previous sample(s), for example based on some form of probability threshold rule, to either sample position i or not.

According to an embodiment, it is sampled periodically roughly a small (constant) number of points, potentially a single point, of the time series out of every M points of the time series for a suitable value M. After each such set of sample(s), it is decided either to continue sampling if the recent sample(s) are (is) sufficiently unlikely to have been generated by the nominal distribution P0, or else to stop sampling. The decision to continue sampling becomes more stringent as more samples are taken, thus limiting the average sampling rate.

An example embodiment of the invention consists of sampling based on test phases. Each test phase has a length, and a probability threshold such that it is moved from test phase i to test phase i+1 only if the probability of the sample(s) observed in test phase i is sufficiently small under the nominal distribution. Note that there is a lot of flexibility in choosing the lengths and probability thresholds in this multi-phase scheme to achieve asymptotically optimal performance. As a specific example, it can be chosen to make the length of each test phase exponential in the length of the previous phase, but it is emphasized that other choices, such as having the length grow by a constant factor, say double, in the initial phases still achieve the same asymptotic performance. In general, the lengths and probability thresholds need to be chosen so that the sampling rate is dominated by the first phase, which roughly translates to a condition of the form $\Sigma_i p_i l_{i+1} = o(l_0(n))$, where $p_i$ is the probability (under the nominal distribution) of deciding to move from phase i to phase $l_{i+1}$, is the number of samples taken in phase i+1, and $l_0(n)$ is the number of samples taken in the first phase. Any such choice can be used to detect the change-point with asymptotically optimal sampling rate.

It is emphasized that the test phases are not necessarily discrete phases, but can be continuous as mentioned earlier, i.e. at each time i, an algorithm A_i can be used to decide whether to sample at time i based for instance on all previously taken samples. Hence, it is most general form, the invention relates to a method of detecting transient changes in the distribution of a discrete time series, which comprises, at each point in time, running a test to decide whether or not operating a sampler to acquire a sample of the time series.

In one specific choice of lengths and probability thresholds, the invention proposes to switch to higher sampling rates only if a series of tests have shown to be positive. The series of tests further allows the sampler to stop sampling in case the expected transient change is not present.

To this respect, the invention proposes a transient change detection method, wherein the sampler 2 switches from a sparse mode wherein it captures samples of the time series during sniff periods successively repeated at a first rate f1 to a dense mode wherein it captures samples of the time series at a second rate f2 which is higher than the first rate (f1 =k*f2, with 0<k<1). The second rate f2 is preferably set to 1 to ensure full sampling of the time series when operating in the dense mode.

The switching from the sparse mode to the dense mode is performed only if a series of tests performed on the samples captured during a sniff period are positive and a sniff period being terminated as soon as a test of the series of tests is negative.

According to a possible embodiment, in a sniff period of the sparse mode, the transient change detector 1 performs at most K test phases, K being an integer superior or equal to two. Each test phase consists of analyzing, by the sampling stopping time determination unit 3, at least one sample of the time series captured by the sampler 2 at sampling time(s) according to the second rate f2 to provide a positive or negative result of the test phase. Each test phase therefore implements a binary hypothesis test for discriminating hypothesis H0 corresponding to nominal observations, against hypothesis H1 corresponding to change observations.

The sniff period is ended as soon as the analyzing of the captured sample(s) in a test phase of the sniff period provide a negative result, the sampling of the time series being stopped until the next sniff period.

A next test phase of the sniff period is performed only if the result of the previous test phase of the sniff period is positive, the next test phase being performed with analyzing at least as many sample(s) as the previous test phase. Preferably a next test is performed with analyzing more samples than the previous test phase.

If the results of the K successive test phases of the sniff period are each positive, the sampler 2 switches to operating in the dense mode. The dense mode lasts for at most n samples captured at the second sampling rate f2. The sampler 2 therefore switches back to the sparse mode from the dense mode after having captured samples at the second sampling rate f2 at most n successive times.

In an embodiment, in a test phase of a sniff period exponentially more samples are analyzed than in the previous test phase of the sniff period.

In a sniff period, the analysis performed by the stopping time determination unit 3 may be identical or different from one test phase to another. More than one analysis may be performed in a test phase, so that the test phase is decided as positive or negative considering the results of these various analyses.

Analyzing the captured samples in a test phase may comprise determining a probability that said captured samples are typical of an expected transient change. Said analyzing may comprise determining a probability of observing the analyzed captured samples in the presence, or respectively absence, of the expected transient change, comparing the probability to a threshold, and providing a positive result of the test phase if said probability is upper, respectively lower, than the threshold.

Said analyzing the captured samples in a test phase may comprise calculating the empirical distribution of the analyzed captured samples and comparing said empirical distribution to a theoretical distribution corresponding to the absence, or respectively presence, of the expected transient change.

Figure 1:
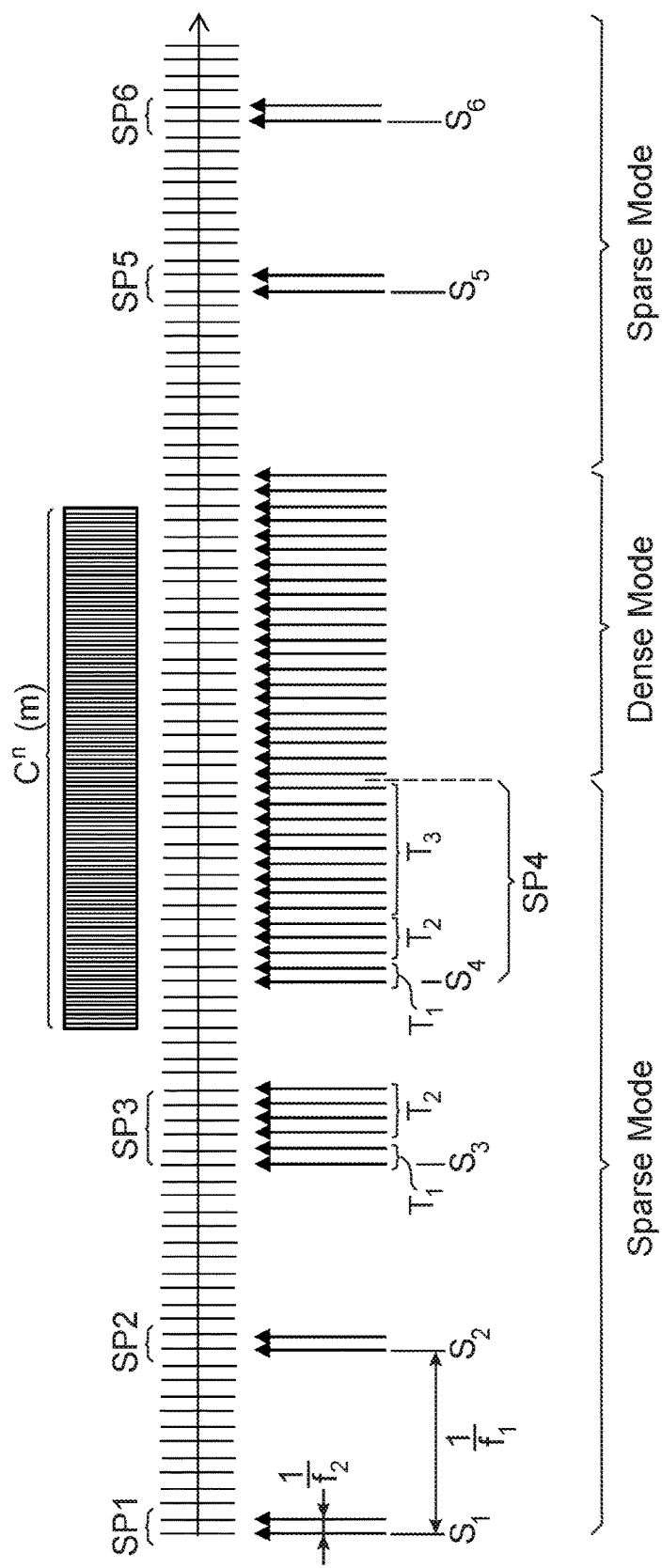
FIG. 1 is a time representation of the method of the invention.

A preferred although non limitative embodiment is now described with reference to FIG. 1 which shows a time representation of the method of the invention given for illustrative purpose.

The method starts in the sparse mode, with the sampler 2 taking samples during sniff periods SP1-SP6 successively repeated at the first rate f1, and which each starts at times Sj=[j/(k*f2)], j being an integer.

At each Sj, the sampler 2 starts taking consecutive samples at the second rate f2. The stopping time determination unit 3 performs a first test T1 by analyzing a first set of consecutive samples. On FIG. 1, for purely illustrative purpose, this first set comprises two consecutive samples.

The first test T1 is negative at sniff periods SP1, SP2, SP5, SP6, so that the sniff period is ended by the stopping time determination unit 3 and sampling is not resumed before the next sniff period SP2, SP3, SP6.

As the first set T1 is positive at sniff periods SP3 and SP4, the stopping time determination unit 3 performs a second test T2 by analyzing a second set of consecutive samples, larger than the first set. On FIG. 1, for purely illustrative purpose, this first set comprises the four consecutive samples after those used in the first test T1. Anyhow, in a more general manner, a next test phase may use totally different samples than those of the previous test(s) (such as the directly successive samples), or may use part or all of the samples of the previous test(s).

The second test T2 is negative at sniff period S3, so that the sniff period is ended and sampling is not resumed before the next sniff period SP4.

The second test T2 is positive at sniff period S3, so that a third test T3 is performed, here with eight consecutive samples. The third test T3 is positive meaning that all the consecutive tests that can associated with a sniff period are positive, and the sampler 2 then switches to dense mode taking samples continuously at the second rate f2.

When in the dense mode, the sampler takes samples continuously at said second rate f2 for at most n steps. When switching back to the sparse mode, samples captured in the dense mode may be ignored or not in making the decision to sample densely or not in the future. In other words, only samples captured in the sparse mode may be or not analyzed to decide whether or not to switch to the dense mode.

Figure 2:
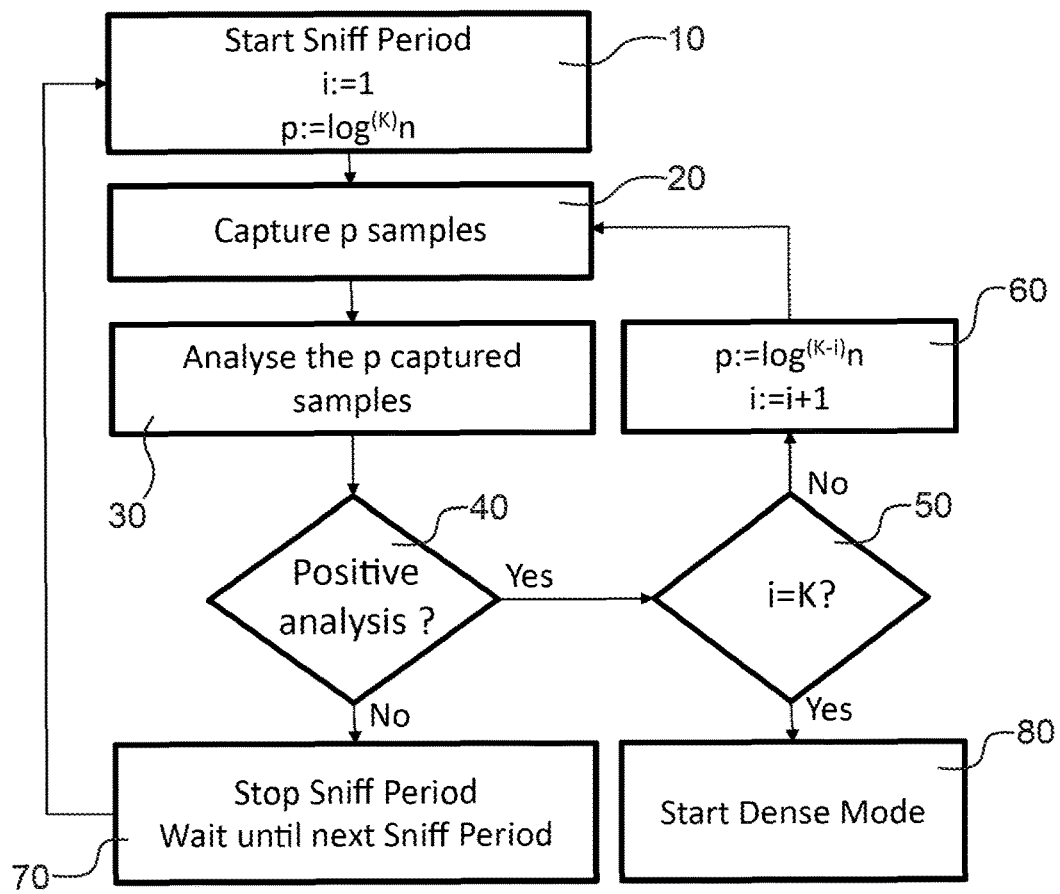
FIG. 2 is a flowchart illustrating the various steps of a possible embodiment of the method of the invention.

FIG. 2 is a flowchart of the method according to a possible embodiment of the invention. The method starts in the sparse mode. At step 10, a sniff period is started, while the number i of test phases is initialized to one and the number p of samples to be captured by a test phase is initialized to $\log^{(K)} n$, where $\log^{(K)}$ denotes K iterations of the log function:: $\log(\log( \ldots (\log(n)))$. A test phase is then performed which consists at step 20 to capture p samples, at step 30 to analyze the p captured samples, and at step 40 to verify whether or not the test is positive. If the test if positive (low probability that the samples are typical with the nominal distribution), it is checked at step 50 whether all the K tests have been performed or not. If not, at step 60, the number p of samples to be captured by the next test phase is set to $\log^{(K-i)} n$, and then the number of test phases i is increased by one. The steps 20, 30, 40 are then reiterated.

If a test is negative (the samples are evaluated as typical with the nominal distribution) at step 40, then step 70 is performed which consists in ending the sniff period, stopping sampling and waiting until the next sniff period starts (step 10).

If it appears at step 50 that K positive tests have been performed, then step 80 is performed which consists in switching to the dense mode for capturing at most n samples at the second rate f2.

The invention is not limited to the above-described method, but also extends as shown on FIG. 3 to a transient change detector 1 comprising a sampler 2 to capture samples of a time series TS and a sampling stopping time determination unit 3 to control operation of the sampler and analyze the captured samples, wherein the sampling stopping time determination unit 2 is configured to switch operation of the sampler 3 from capturing samples during sniff periods successively repeated at a first rate to capturing samples at a second rate which is higher than the first rate, the sampling stopping time determination unit being further configured to perform switching of the sampler operation only if a series of tests performed by the sampling stopping time determination unit on the samples captured during a sniff period are each positive, and to terminate a sniff period as soon as a test of the series of tests is negative. The transient change detector 1 may further comprise a storage unit 4 where the samples corresponding to the transient change and captured when the sampler 2 is operating in the dense mode can be stored and from which they can be retrieved.

An exemplary, although non limitative, example of application of the invention relates to asynchronous data communication over a data communication channel between a transmitter and the receiver, the receiver including the previously described transient change detector 1. In such an example, the transient change to be identified correspond to an information message being sent on the data communication channel at a time which is unknown to the receiver.

In this asynchronous data communication framework, the nominal distribution of the observed time series corresponds to pure noise, the change duration correspond to the lengths of the codewords sent on the data communication channel and the change distribution corresponds to the set of channel output distributions induced by the codewords.

Before and after the change, the receiver sees, at those times where it chooses to sample the channel output, independent and identically distributed noise. During the change, the receiver sees, at those times where it chooses to sample the output, symbols $c_i(m)$ of the codeword assigned to an information message.

The noise and the change distributions can be unified by modeling the time series as carried over a data communication channel characterized by its finite input and output alphabets $X \cup \{*\}$ and Y, respectively, and transition probability matrix $Q(y|x)$, for all $y \in Y$ and $x \in X \cup \{*\}$. The special symbol * denotes noise.

The receiver observes independent channel outputs $Y_1, Y_2, \ldots, Y_{A+n-1}$ distributed as follows, depending upon time v at which the codeword starts being sent:

for $1 \leq i \leq v-1$ or $v+n \leq i$, the $Y_i$'s are "pure noise" symbols, i.e., $Y_i \sim Q(\bullet|*)$;

for $v \leq i \leq v+n-1$, $Y_i \sim Q(\bullet|c_{i-v+1}(m))$, where $c_i(m)$ denotes the $i^{th}$ symbol of a codeword (m).

The codeword c(m) may start by a preamble P which size is greater that the sniff period repetition distance 1/f1 corresponding to the first rate. This ensures that at least one symbol from the preamble is captured by the sampler in the sparse mode. Of course, the preamble's size is preferably chosen so as to allow for sampling a large number of preamble's symbols.

The preamble may consist of successive repetitions of a symbol a, which is preferably chosen so that $Q(\bullet|a)$ strongly differs from $Q(\bullet|*)$. The invention is not limited to such an embodiment, but extends to the use of a preamble consisting of different symbols, preferably of symbols that predominantly differ from the symbol * denoting noise. The various tests T1-T3 may be similar or not, but each consists in verifying whether the samples captured in a test are typical with $Q(\bullet|a)$.

In an embodiment, the preamble is made of $s_q(n)$ symbols, with q an integer superior or equal to one. The number of symbols $s_q(n)$ may be equal to $n/\log^{(q)} n$, where $\log^{(q)}$ denotes q iterations of the log function:: $\log(\log(\ldots(\log(n))))$.

Dealing with asynchronous data communication, not only change detection can be performed but also change isolation as decoding of the transmitted data is performed at the receiver. Decoding happens based on a sampling strategy, a stopping rule defined on the sampled process, and an isolation rule which maps the stopped sampling process with a possible message. Here the sampling strategy and the stopping rule are the ones described above.

As for the isolation rule, the receiver may perform sequential decoding implemented at each step of the at most n steps if the dense mode based on the past samples. If no codeword is decoded at the end of the n steps of the sequential decoding operation, or as soon as a codeword is decoded by the sequential decoding operation, the sampler switches from operating in the dense mode to operating in the sparse mode.

As a purely illustrative example, the sequential decoding is for instance a sequential typicality decoding, whereby at a step of the dense mode, the empirical distributions induced by the last samples is calculated. This empirical distribution is compared to the theoretical distribution induced by each codeword, and if there exists a message m for which the distance in between the empirical distribution and the theoretical distribution induced by the codeword assigned to the message is lower than a threshold, then the receiver declares that message m was sent.

As an alternative, decoding may not be performed sequentially but only once after n samples have been captured using a low complexity decoder for any state-of-the-art channel code, e.g., an LDPC code or a turbo code. Once the dense mode is entered, the low-complexity decoder runs on the n samples. If a codeword is found, the probability of the n observed sampled assuming that this codeword was sent is evaluated, and if this probability exceeds a threshold, decoding is stopped and this codeword is declared. If the probability does not exceed the threshold, or if no codeword is found, e.g., the decoder fails to converge, the sampler switches from operating in the dense mode to operating in the sparse mode.

What is claimed is:

1. A method of detecting transient changes in a distribution of a discrete time series, wherein a sampler switches from operating in a sparse mode to operating in a dense mode wherein the sampler is operated to continuously capture samples of the time series at a sampling rate, comprising the steps of:

operating in the sparse mode wherein the sampler captures samples of the time series during sniff periods, the sniff periods being successively repeated at a sniffing rate that is lower than the sampling rate, and wherein during a sniff period at most K test phases are performed, K being an integer greater than or equal to two, each test phase consisting of analyzing, by a sampling stopping time determination unit, at least one sample of the time series captured by the sampler at sampling times according to the sampling rate to provide a positive or negative result of the test phase, if results of K successive test phases of a sniff period are each positive, switching to operate in the dense mode wherein the sampler is operated to continuously capture samples of the time series at sampling times according to the sampling rate, wherein the sniff period is ended as soon as a result of a test phase of the sniff period is negative, the sampling of the time series being stopped until a next sniff period, and wherein a next test phase of the sniff period is performed only if a result of a previous test phase of the sniff period is positive, the next test phase being performed with analyzing at least as many samples as the previous test phase.

2. The method of claim 1, wherein the next test phase of the sniff period analyses exponentially more samples than the previous test phase of the sniff period.

3. The method of claim 1, wherein said analyzing, in each test phase, at least one sample comprises determining a probability that said at least one sample is typical of an expected transient change in the distribution of the discrete time series.

4. The method of claim 3, wherein said analyzing, in each test phase, at least one sample comprises determining a probability of observing said at least one sample in a presence, respectively absence, of the expected transient change, comparing the determined probability to a threshold, and providing a positive result of the test phase if said determined probability is greater, respectively lower, than the threshold.

5. The method of claim 4, wherein, in each test phase, at least one sample comprises calculating an empirical distribution of the at least one sample and comparing said empirical distribution to a theoretical distribution in the presence, respectively absence, of the expected transient change on a data communication channel.

6. The method of claim 1, wherein the transient changes correspond to information messages being received at times which are unknown to a receiver which includes said sampler and said sampling stopping time determination unit.

7. The method of claim 6, wherein an absence of a transient change corresponds to presence of noise only on an asynchronous data communication channel by which the receiver receives the information messages.

8. The method of claim 6, wherein a transient change in the distribution is a change sequence which comprises a preamble which size is larger than a period corresponding to the sniffing rate separating two successive sniff periods.

9. The method of claim 8, wherein the preamble consists of successive repetitions of a symbol.

10. The method of claim 9, wherein the change sequence is made of n successive symbols consisting of $n/\log^{(q)}n$ symbols for the preamble and $n-n/\log^{(q)}n$ symbols for a codeword, where $\log^{(q)}$ denotes q iterations of the log function.

11. The method of claim 10, wherein a test of a sniff period analyses $\log^{(K-i)}n$ samples and a next test of the sniff period analyses $\log^{(K-(i+1))}n$, with i an integer comprises between 0 and K−2.

12. The method of claim 8, wherein a number of samples captured in the dense mode is at most a number of symbols that compose the change sequence.

13. The method of claim 12, further comprising in the dense mode operating a decoder to sequentially decode the samples captured at sampling times according to the sampling rate.

14. The method of claim 13, further comprising, if no codeword is decoded at an end of the sequential decoding operation, or as soon as a codeword is decoded by the sequential decoding operation, switching from operating in the dense mode to operating in the sparse mode.

15. A transient change detector comprising the sampler and the sampling stopping time determination unit configured to implement the method according to claim 1.

* * * * *

UNITED STATES PATENT AND TRADEMARK OFFICE
CERTIFICATE OF CORRECTION

PATENT NO. : 10,116,434 B2
APPLICATION NO. : 15/539001
DATED : October 30, 2018
INVENTOR(S) : Venkat Chandar et al.

It is certified that error appears in the above-identified patent and that said Letters Patent is hereby corrected as shown below:

In the Specification

Column 4, Line 57, "phase $l_{i+1}$" Should be -- phase $i+1$, $l_{i+1}$ --.

Column 8, Line 15, "$\log^{(g)}$" Should be -- $\log^{(q)}$ --.

Signed and Sealed this
Tenth Day of November, 2020

Andrei Iancu
*Director of the United States Patent and Trademark Office*